United States Patent [19]

Walendy et al.

[11] Patent Number: 5,529,824
[45] Date of Patent: Jun. 25, 1996

[54] FILLER BODY AS MOLDED PART FOR SEALING POORLY ACCESSIBLE HOLLOW SPACES

[75] Inventors: Hans Walendy, Wathlingen; Eberhard Püschmann, Nienhagen; Edmund Riggers, Hermannsburg, all of Germany

[73] Assignee: Stankiewicz GmbH, Adelheidsdorf, Germany

[21] Appl. No.: 244,466
[22] PCT Filed: Nov. 25, 1992
[86] PCT No.: PCT/EP92/02717
§ 371 Date: Sep. 6, 1994
§ 102(e) Date: Sep. 6, 1994
[87] PCT Pub. No.: WO93/11001
PCT Pub. Date: Jun. 10, 1993

[30] Foreign Application Priority Data

Dec. 3, 1991 [DE] Germany .......................... 41 39 858.0

[51] Int. Cl.⁶ .......................................................... B32B 1/04
[52] U.S. Cl. .................................. 428/75; 428/71; 428/72; 428/76; 428/304.4; 428/913
[58] Field of Search ................................. 428/72, 75, 76, 428/128, 71, 174, 182, 304.4, 913

[56] References Cited

U.S. PATENT DOCUMENTS 4,259,028  3/1981  Cook ......................................... 428/192
4,359,496  11/1982  Kratel et al. ............................... 428/75
4,726,974  2/1988  Nowobilski et al. ....................... 428/75

FOREIGN PATENT DOCUMENTS

| 0447939A1 | 9/1991 | European Pat. Off. . |
| 18211797 | 9/1982 | Germany . |
| 13506004 | 8/1986 | Germany . |
| 18707140 | 10/1987 | Germany . |
| 3842890A1 | 6/1989 | Germany . |
| 13826012 | 2/1990 | Germany . |
| 62139739 | 9/1991 | Japan . |

OTHER PUBLICATIONS

International Search Report PCT/EP 92/02717.

*Primary Examiner*—Donald J. Loney
*Attorney, Agent, or Firm*—Scully, Scott, Murphy & Presser

[57] ABSTRACT

The invention relates to a filler body (1) for acoustic and thermal sealing of hollow spaces in vehicle bodywork, constituted as a molded part of resilient, porous material (4) of sufficient restoring resilience, enveloped in foil, which part is subjected to a vacuum prior to introduction into the hollow space (5). The molded part is self-supporting and has, in the direction of introduction, which is perpendicular to the plane of installation, a large bending stiffness by virtue of a flat, thin intermediate layer (3).

19 Claims, 1 Drawing Sheet

FILLER BODY AS MOLDED PART FOR SEALING POORLY ACCESSIBLE HOLLOW SPACES

BACKGROUND OF THE INVENTION

1. Field of the Invention

The invention relates to a filler body for acoustic and thermal sealing of a hollow space in a vehicle body, constituted as a molded part of resilent porous material having restoring resilience, enveloped in a foil envelope, having a vacuum in the foil envelope to shrink the resilient porous material prior to introduction of the filler body into the hollow space.

2. Description of the Prior Art

In accordance with DE-OS 35 06 004 a filler body of open-celled foam material is known which has the advantage of favourable storage and delivery which can be attained by compression, but which on the other hand can be introduced most favourably even into cramped receiving spaces. The filler body is placed in the receiving space in the as-delivered, compressed form. After positioning, the enclosing foil is ruptured, whereby the filler body spontaneously expands, nestling with maximum restored cross-section, whereby the restoring force can be used for securing the position of the inserted filler body.

The filler body is introduced into closed sections, for example box sections, which are open at one or both ends. The known filler body is not, however, self-supporting, with the result that, for sections which are open in the longitudinal direction or for hollow spaces which are open in other ways, in the case of difficult access to these sections and/or in the case of complicated geometry, reliable fixing is not possible.

DE-GM 87 07 140 is named as a further example of the state of the art in which a filler body for acoustically sealing pipe-like bodies is described. In the above-mentioned Utility Model a filler body is represented which is suitable for achieving reliable and rapid acoustic sealing of pipe-like hollow bodies, adaptable to the applicable situation, and which avoids the disadvantage that it can only be brought into easily accessible positions. A specific foam mixture is indicated for this filler body, as are further features such as weight per unit volume (density), open pore ratio, a particular recoil resilience and a high rebound speed. It is also introduced into the pipe-like hollow body with the use of a vacuum, whereafter the vacuum is then removed from the envelope. This filler body also is not self-supporting or stable in its dimensions and can be used only in pipe sections.

Thus, the object of the invention is to provide a filler body which possesses inherent stability and can be introduced, with reliability of installation, into regions of a car body which are difficult to access and/or are formed spatially complicated, in particular with widely open hollow spaces.

SUMMARY OF THE INVENTION

This object is achieved the molded part having a flat, thin intermediate layer sandwiched within the resilient porous material which provides a large bending stiffness to the filler body to make it self-supporting in a direction of introduction, which is perpendicular to a plane of installation into the hollow space in the vehicle body.

The invention thus provides a molded part of a resilient material, in particular foam, with a flat-shaped intermediate layer with relatively low material thickness, the intermediate layer being so arranged that its transverse direction lies parallel to the transverse direction of the resilient material enclosing it. As materials for the intermediate layer, favourably priced products can be used, such as materials recovered by recycling processes or for example cardboard, to the extent that they are sufficiently self-supporting. The molded part is enveloped in foil and compressed by vacuum, so that it can be introduced into car body spaces which are difficult to access and there, after removal of the vacuum, assumes sealing and sound damping functions.

The advantages achieved with the invention consist in particular in that through the introduction of the stiffly bending, flat intermediate layer into the filler body, the filler body is self-supporting and has a high bending stiffness in at least one direction, this direction being simultaneously the direction of introduction into the hollow space. Through the introduction of the stiffly bending and flat intermediate layer into the filler body, secure installation is ensured and the filler body is given inherent stability. The so-formed filler bodies can have practically any desired shape.

The subject of the invention is further characterized is that the body has three layers, two outer layers of resilient, porous material and the flat, thin intermediate layer, wherein the resilient, porous material substantially completely surrounds the flat, thin intermediate layer. Moreover, the flat, thin intermediate layer can have sections which, are twisted relative to each other, wherein the sections are unseparated from each other. The filler body seals hollow spaces which have two surfaces spaced apart from one another and after removal of the vacuum, the filler body is brought into a fit in a hollow space of the vehicle body by restoring forces of the resilient porous material. The flat, thin intermediate layer can comprise cardboard, and can be secured against displacement. The molded part can have a shape which is elongated and bent, similar to that of a boomerang.

BRIEF DESCRIPTION OF THE DRAWINGS

The invention will be explained in more detail with reference to the exemplary embodiment shown in the drawings.

DETAILED DESCRIPTION OF THE DRAWINGS

Figure 1:
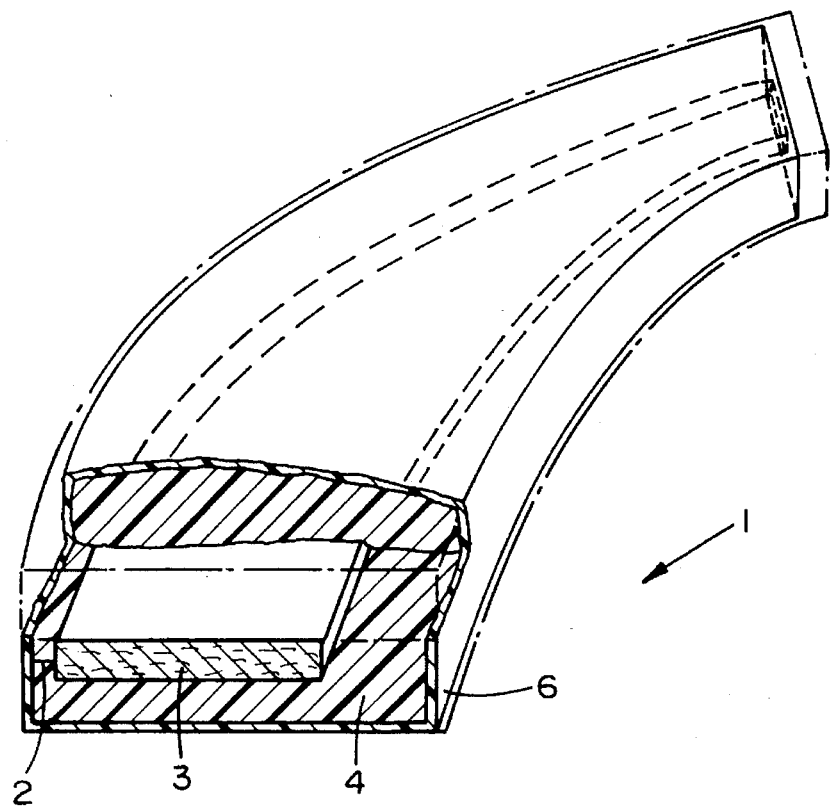
FIG. 1 shows schematically in a top view an embodiment of the filler body.

The filler body 1 represented in the Figures has, as an example, a shape similar to a boomerang. Thus, a flat, bent but nonetheless elongate body should be considered. To achieve the filler body 1 in accordance with the invention, the flat bent object is cut open in the transverse direction and a flat intermediate layer 3 with relatively low material density is arranged in this cut 2 so that its transverse direction is parallel to the transverse direction of the resilient material 4 surrounding it. The intermediate layer 3 can also be introduced without a special cut 2 therefor, by forming the material 4 around it. The filler body is thus made up of three layers (region of the material 4 to the right of the intermediate layer 3, intermediate layer 3, region of material to the left of the intermediate layer 3). These three layers are, as a rule, held together by frictional forces. If this static friction is not sufficient, it is possible to bind the layers to one another by special additional measures such as gluing or increasing the frictional forces by means of rough surfaces of the intermediate layer 3. With flat, elongate filler bodies 1 the bending stiffness about the vertical axis (transverse to the greatest extension) is always very high. When this plane of greater bending stiffness is selected as the direction of introduction, that is, stands perpendicularly on the plane of installation, a reliable introduction even into car body regions 5 which are poorly accessible and formed in a complicated fashion is possible.

Prior to the introduction of a filler body 1 into the intended region 5 for acoustic sealing thereof, the filler bodies are wrapped in plastics foils 6 of approximately 10 μm to 50 μm thickness and a vacuum is applied in a known manner. Although each dimension is somewhat reduced by application of the vacuum, the intermediate layer 3, which is very stiff in one bending direction, limits this effect and only the thickness of the foam material 4 surrounding the intermediate layer 3 is much compressed. The bending stiffness required for installation is retained.

Figure 2:
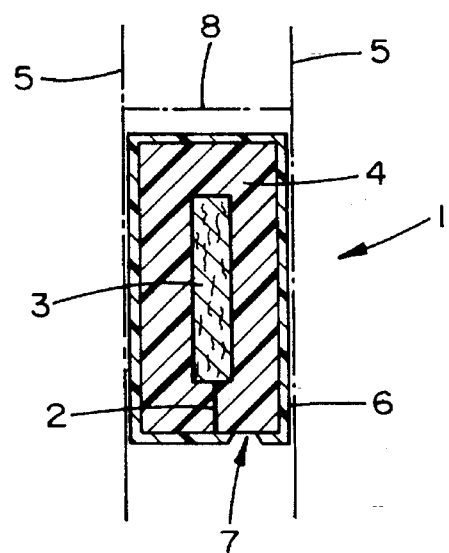
FIG. 2 shows schematically a section through the filler body of FIG. 1, to illustrate the construction.

The construction of the filler body 1 in accordance with this invention makes it possible for any arbitrary hollow space to be sealed by a correspondingly formed filler body 1, and a restriction to pipe-like or box-like sections is no longer necessary. Merely two mutually spaced-apart surfaces (compare FIG. 2) are needed between which the filler body 1 can be introduced and, after rupture (rupture location 7) of the foil 6 (FIG. 2), can be brought to a fit by the restoring forces. The filler body 1 can, however, also be introduced into differently formed hollow spaces, as indicated by a chain line 8.

A reliable fixing is provided even when mechanical resistances occurs during introduction of a filler body 1 according to the invention. These can be overcome by force. The described intermediate layer 3 can, with hollow spaces which are formed in a very complicated fashion, have sections twisted with respect one to another, but the installation of the filler body 1 must be effected in the direction of greatest stiffness in each case and the sections of the intermediate layer 3 angled or twisted one relative to the other should, preferably, not be separated one from another.

Suitable for resilient material 4, for surrounding the intermediate layer 3, are cut foams and molded foams or flaked foam and in general all porous materials which develop sufficient restoring force (from the evacuated condition). As an example: for the material 4 cut foam of normal quality is used. It is provided with a centrally arranged intermediate layer of cardboard. The foam used has a density of 20 kg/m$^3$. The intermediate layer 3, secured against displacement and of cardboard, is preferably provided in the middle of the cut foam, for example polyether or PUR (polyurethane) foam, having an apparent density of (20±4)kg/m$^3$, and has for example a thickness of 3±0.5 mm for a corresponding edge length of the filler body 1 of 30 mm. This cut foam is surrounded by a transparent PUR (polyurethane) foil 6 which is watertight, temperature resistant and functional in temperature regions from −40° C. to +120° C. The selection is possible for the average skilled man in this field by means of a simple and rapidly carried out trials. Likewise, the vacuum prior to installation is achieved through the generally known state of the art. The necessary vacuum pressure and the incorporation of the filler body 1 at the above-described locations or regions is possible for the average skilled man through simple trial without effort worthy of mention.

Along with cut foams, molded foams can be used, generally with 80 kg/m$^3$. Likewise, recycled foam materials in the form of flakes, with or without binders, can be adopted. The processing of these materials 4 is carried out in the normal way.

The use of the filler body 1 is intended for hollow spaces 5 which, for example, are formed by the external car body sheeting and the internal partitioning from the trunk or boot in the region of the forced ventilation paths. By means of the provision of the filler body 1 an acoustic and thermal sealing is achieved. Application in similar situations outside of the vehicle industry is also possible and similarly effective.

We claim:

1. A filler body (1) for acoustic and thermal sealing of a hollow space (5) in a vehicle body, constituted as a molded part of resilient porous material (4) having restoring resilience, enveloped in a foil envelope (6), having a vacuum in the foil envelope to shrink the resilient porous material prior to introduction of the filler body into the hollow space, characterized in that the molded part has a flat, thin intermediate layer (3) sandwiched within the resilient porous material which provides a large bending stiffness to the filler body to make it self-supporting in a direction of introduction, which is perpendicular to a plane of installation in the hollow space in the vehicle body.

2. A filler body (1) according to claim 1, characterized in that the body has three layers, two outer layers of resilient, porous material and an inner intermediate layer comprised of said flat, thin intermediate layer, wherein the resilient, porous material (4) substantially completely surrounds the flat, thin intermediate layer.

3. A filler body (1) according to claim 1, characterized in that the flat, thin intermediate layer (3) has sections which are twisted relative to each other, and the sections are unseparated from each other.

4. A filler body (1) according to claim 2, characterized in that the flat, thin intermediate layer (3) has sections which are twisted relative to each other, and the sections are unseparated from each other.

5. A filler body (1) according to claim 1, characterized in that the filler body seals a hollow space (5) of the vehicle body which has two surfaces spaced apart from one another and after removal of the vacuum, the filler body is brought into a fit in the hollow space by restoring forces of the resilient porous material.

6. A filler body (1) according to claim 2, characterized in that the filler body seals a hollow space, (5) of the vehicle body which has two surfaces spaced apart from one another and after removal of the vacuum, the filler body is brought into a fit in the hollow space by restoring forces of the resilient porous material.

7. A filler body (1) according to claim 3, characterized in that the filler body seals a hollow space (5) of the vehicle body which has two surfaces spaced apart from one another and after removal of the vacuum, the filler body is brought into a fit in the hollow space by restoring forces of the resilient porous material.

8. A filler body (1) according to claim 1, characterized in that the flat, thin intermediate layer (3) comprises cardboard.

9. A filler body (1) according to claim 2, characterized in that the flat, thin intermediate layer (3) comprises cardboard.

10. A filler body (1) according to claim 3, characterized in that the flat, thin intermediate layer (3) comprises cardboard.

11. A filler body (1) according to claim 1, characterized in that the flat, thin intermediate layer (3) is secured against displacement relative to the resilient porous material.

12. A filler body (1) according to claim 2, characterized in that the flat, thin intermediate layer (3) is secured against displacement relative to the resilient porous material.

13. A filler body (1) according to claim 3, characterized in that the flat, thin intermediate layer (3) is secured against displacement relative to the resilient porous material.

14. A filler body (1) according to claim 1, characterized in that the molded part has a shape which is elongated and bent.

15. A filler body (1) according to claim 14, characterized in that the molded part has a shape similar to that of a boomerang.

16. A filler body (1) according to claim 2, characterized in that the molded part has a shape which is elongated and bent.

17. A filler body (1) according to claim 16, characterized in that the molded part has a shape similar to that of a boomerang.

18. A filler body (1) according to claim 3, characterized in that the molded part has a shape which is elongated and bent.

19. A filler body (1) according to claim 18, characterized in that the molded part has a shape similar to that of a boomerang.

* * * * *